(12) United States Patent
Lee et al.

(10) Patent No.: US 10,815,314 B2
(45) Date of Patent: Oct. 27, 2020

(54) AMINE COMPOUND, MODIFIED CONJUGATED DIENE-BASED POLYMER CONTAINING FUNCTIONAL GROUP DERIVED THEREFROM, AND METHOD OF PREPARING THE MODIFIED CONJUGATED DIENE-BASED POLYMER

(71) Applicant: LG Chem, Ltd., Seoul (KR)

(72) Inventors: Sang Mi Lee, Daejeon (KR); Hae Sung Sohn, Daejeon (KR); Heung Yeal Choi, Daejeon (KR); No Ma Kim, Daejeon (KR)

(73) Assignee: LG Chem, Ltd. (KR)

( * ) Notice: Subject to any disclaimer, the term of this patent is extended or adjusted under 35 U.S.C. 154(b) by 191 days.

(21) Appl. No.: 16/066,182

(22) PCT Filed: Dec. 28, 2017

(86) PCT No.: PCT/KR2017/015670
§ 371 (c)(1),
(2) Date: Jun. 26, 2018

(87) PCT Pub. No.: WO2018/128330
PCT Pub. Date: Jul. 12, 2018

(65) Prior Publication Data
US 2020/0148794 A1  May 14, 2020

(30) Foreign Application Priority Data

Jan. 6, 2017 (KR) .......................... 10-2017-0002435
Nov. 8, 2017 (KR) .......................... 10-2017-0147884

(51) Int. Cl.
*C08C 19/25* (2006.01)
*C07F 7/18* (2006.01)
*C08C 19/44* (2006.01)

(52) U.S. Cl.
CPC ............ *C08C 19/25* (2013.01); *C07F 7/1804* (2013.01); *C08C 19/44* (2013.01)

(58) Field of Classification Search
CPC . C08C 19/25; C08C 19/22; C08L 9/06; C08L 9/00; C08F 236/06; C08F 236/08; C08F 236/10
See application file for complete search history.

(56) References Cited

U.S. PATENT DOCUMENTS

| 3,560,546 A | 2/1971 | Frye et al. |
| 9,090,730 B1 | 7/2015 | Mazumdar et al. |
| 9,109,073 B1 | 8/2015 | Ma et al. |
| 2009/0221751 A1 | 9/2009 | Hasse et al. |
| 2015/0148477 A1 | 5/2015 | Ma et al. |
| 2018/0066077 A1 | 3/2018 | Choi et al. |

FOREIGN PATENT DOCUMENTS

| EP | 3101036 A1 | 12/2016 |
| JP | 2015131943 A | 7/2015 |
| JP | 201644305 A | 4/2016 |
| JP | 2016074877 A | 5/2016 |
| KR | 100808258 | * 2/2008 |
| KR | 20080098589 A | 11/2008 |
| KR | 101023260 B1 | 3/2011 |
| KR | 20160149801 A | 12/2016 |
| WO | 2016208739 A1 | 12/2016 |

OTHER PUBLICATIONS

KR 10 0808258 machine translation (2008).*
Search report from International Application No. PCT/KR2017/015670, dated Apr. 9, 2018.
Lazareva, N. F., et al., Dehydrochlorination of chloroform by N-methyl-N,N-bis(silatranylmethyl)amine, Russian Chemical Bulletin, International Edition, vol. 60, No. 3, Mar. 2011, pp. 585-587.
Sorokin, M. S., et al., "Selenium- and Tellurium-containing Silatrane Derivatives Having an ECH2Si Frangment (E = Se, Te)." Russian Journal of General Chemistry, 2006, vol. 76, No. 3, pp. 461-468.
Lazareva, N. F., et al., Dehydrochlorination of chloroform by N-methyl-N,N-bis(silatranylmethyl)amine, Russian Chemical Bulletin, International Edition, vol. 60, No. 3, Mar. 2011, pp. 598-600.
Extended European Search Report including Written Opinion for Application No. EP17879654.6 dated Jan. 8, 2019.
Lazareva, N. F. et al., "Reaction of Sodium Amide with 1-Chloromethylsilatrane," Russian Journal of Organic Chemistry, vol. 44, No. 10, Jun. 16, 2008; pp. 1543-1546.
Sorokin, M.S. et al., "!,1-Dimethyl-1-(trialkoxysilymethyl)hydrazinium and 1,1-Dimethyl-1-(silatranylmethyl) hydrazinium Halides," Russian Journal of general Chemistry, vol. 75, No. 6, pp. 862-866.
Guanli, W. et al., "Study on group transformation on side chain of Silatranes," Chemistry (Huaxue Tongbao), Chemical Bulletin, Dec. 31, 1983; pp. 10-11.
Search Report from Chinese Office Action for Application No. 201780007028.X dated Apr. 3, 2020; 3 pages.

* cited by examiner

*Primary Examiner* — Kuo Liang Peng

(74) *Attorney, Agent, or Firm* — Lerner, David, Littenberg, Krumholz & Mentlik, LLP

(57) ABSTRACT

The present invention relates to a modified conjugated diene-based polymer containing a functional group derived from a tertiary amine compound represented by Formula 1, a method of preparing the same, and a tertiary amine compound represented by Formula 1.

20 Claims, No Drawings

AMINE COMPOUND, MODIFIED CONJUGATED DIENE-BASED POLYMER CONTAINING FUNCTIONAL GROUP DERIVED THEREFROM, AND METHOD OF PREPARING THE MODIFIED CONJUGATED DIENE-BASED POLYMER

CROSS-REFERENCE TO RELATED APPLICATIONS

The present application is a national phase entry under 35 U.S.C. § 371 of International Application No. PCT/KR2017/015670 filed Dec. 28, 2017, which claims priority from Korean Patent Application No. 10-2017-0002435 filed Jan. 6, 2017 and Korean Patent Application No. 10-2017-0147884 filed Nov. 8, 2017, all of which are incorporated herein by reference.

TECHNICAL FIELD

The present invention relates to a modified conjugated diene-based polymer containing a functional group derived from a tertiary amine compound represented by Formula 1, a method of preparing the same, and a tertiary amine compound represented by Formula 1, which is useful as a modifier for rubbers.

BACKGROUND ART

According to the recent demand for cars having a low fuel consumption ratio, a modified conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or low tan δ or Goodrich heat generation.

Natural rubbers, polyisoprene rubbers, or polybutadiene rubbers are known as rubber materials having low hysteresis loss, but these rubbers may have a limitation of low wet skid resistance. Thus, recently, a conjugated diene-based (co)polymer, such as styrene-butadiene rubbers (hereinafter, referred to as "SBR") or butadiene rubbers (hereinafter, referred to as "BR"), are prepared by emulsion polymerization or solution polymerization to be used as a rubber for tires.

In a case in which the BR or SBR is used as the rubber material for tires, the BR or SBR is typically used by being blended with a filler, such as silica or carbon black, to obtain physical properties required for tires. However, since affinity of the Br or SBR with the filler is poor, physical properties, such as abrasion resistance, crack resistance, and processability, may rather be reduced.

Thus, as a method of increasing dispersibility of the SBR and the filler such as silica and carbon black, a method of modifying a polymerization active site of a conjugated diene-based polymer obtained by anionic polymerization using organolithium with a functional group capable of interacting with the filler has been proposed. For example, a method of modifying a polymerization active terminal of a conjugated diene-based polymer with a tin-based compound or introducing an amino group, or a method of modifying with an alkoxysilane derivative has been proposed.

Also, as a method of increasing dispersibility of the BR and the filler such as silica and carbon black, a method of modifying a living active terminal with a specific coupling agent or modifier has been developed in a living polymer obtained by coordination polymerization using a catalyst composition which includes a lanthanide rare earth element compound.

However, BR or SBR modified by the above-described method has a low terminal modification ratio, and the improving effects of physical properties of tires manufactured using the same were insignificant.

DISCLOSURE OF THE INVENTION

Technical Problem

The present invention has been devised to solve the above-mentioned problems of the conventional technique and provides a modified conjugated diene-based polymer containing a functional group derived from a tertiary amine compound represented by Formula 1.

Also, the present invention provides a method of preparing a modified conjugated diene-based polymer using a tertiary amine compound represented by Formula 1.

Further, the present invention provides a tertiary amine compound represented by Formula 1, which is useful as a modifier for rubbers.

Technical Solution

According to an aspect of the present invention, there is provided a modified conjugated diene-based polymer comprising a functional group derived from a tertiary amine compound represented by the following Formula 1:

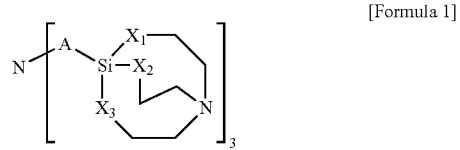

[Formula 1]

in Formula 1,

A is an alkylene group of 1 to 20 carbon atoms, and $X_1$ to $X_3$ are each independently an oxygen atom or an oxygen-containing alkylene group of 1 to 4 carbon atoms.

According to another aspect of the present invention, there is provided a method of preparing the modified conjugated diene-based polymer, including polymerizing a conjugated diene-based monomer, or an aromatic vinyl-based monomer and a conjugated diene-based monomer in the presence of an organometal compound in a hydrocarbon solvent, to prepare an active polymer which is coupled with an organometal at one terminal (step 1); and reacting the active polymer with a tertiary amine compound represented by Formula 1 (step 2):

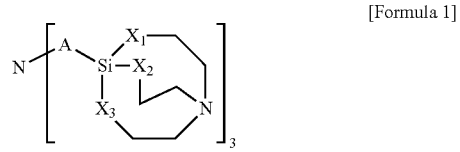

[Formula 1]

in Formula 1,

A is an alkylene group of 1 to 20 carbon atoms, and $X_1$ to $X_3$ are each independently an oxygen atom or an oxygen-containing alkylene group of 1 to 4 carbon atoms.

Also, according to another aspect of the present invention, there is provided a tertiary amine compound represented by the following Formula 1:

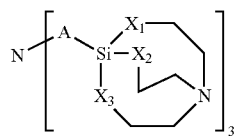

[Formula 1]

in Formula 1,

A is an alkylene group of 1 to 20 carbon atoms, and $X_1$ to $X_3$ are each independently an oxygen atom or an oxygen-containing alkylene group of 1 to 4 carbon atoms.

Advantageous Effects

The modified conjugated diene-based polymer according to the present invention contains a functional group derived from a tertiary amine compound represented by Formula 1, for example, an amine group and a silane group, and may have good affinity with a filler such as a silica-based filler, and may have excellent tensile properties and viscoelasticity properties.

In addition, the method of preparing a modified conjugated diene-based polymer according to the present invention uses a tertiary amine compound represented by Formula 1 as a modifier, and a modified conjugated diene-based polymer with a high modification ratio may be easily prepared.

Also, the tertiary amine compound represented by Formula 1 according to the present invention is used as a modifier for rubbers, particularly, as a modifier of a conjugated diene-based polymer, so as to be coupled with a conjugated diene-based polymer chain to supply a functional group such as an amine group and a silane group.

Best Mode for Carrying Out the Invention

Hereinafter, the present invention will be described in more detail to allow for the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a modified conjugated diene-based polymer comprising a functional group derived from a tertiary amine compound represented by the following Formula 1:

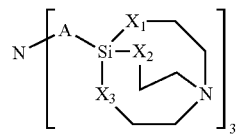

[Formula 1]

in Formula 1,

A is an alkylene group of 1 to 20 carbon atoms, and $X_1$ to $X_3$ are each independently an oxygen atom or an oxygen-containing alkylene group of 1 to 4 carbon atoms.

Particularly, in Formula 1, A may be an alkylene group of 1 to 10 carbon atoms, and $X_1$ to $X_3$ may be each independently an oxygen atom or an oxygen-containing alkylene group of 1 to 2 carbon atoms.

More particularly, the tertiary amine compound represented by Formula 1 may be represented by Formula 2.

[Formula 2]

The modified conjugated diene-based polymer according to an embodiment of the present invention may be prepared by reacting an active polymer which is coupled with an organometal and the tertiary amine compound represented by Formula 1 by a preparation method, which will be described later. The physical properties of the modified conjugated diene-based polymer may be improved by comprising a functional group derived from the tertiary amine compound represented by Formula 1. For example, the modified conjugated diene-based polymer comprises a functional group derived from the tertiary amine compound represented by Formula 1, and may include a functional group having affinity with a filler and a functional group having affinity with a solvent. Accordingly, the abrasion resistance, low fuel consumption ratio and processability of a rubber composition including the modified conjugated diene-based polymer and a molded article manufactured therefrom, such as tires, may be improved.

The modified conjugated diene-based polymer may have a number average molecular weight (Mn) of 100,000 g/mol to 2,000,000 g/mol, particularly, 150,000 g/mol to 1,000,000 g/mol.

Also, the modified conjugated diene-based polymer may have a weight average molecular weight (Mw) of 100,000 g/mol to 5,000,000 g/mol, particularly, 200,000 g/mol to 2,000,000 g/mol.

In addition, the modified conjugated diene-based polymer may have molecular weight distribution (Mw/Mn) of 1.0 to 3.0, and thus, if applying thereof to a rubber composition, tensile properties and viscoelasticity properties may be improved.

Also, in consideration of the improvement in balance between mechanical properties, elastic modulus, and processability of a rubber composition when the modified conjugated diene-based polymer according to an embodiment of the present invention is used in the rubber composition, the modified conjugated diene-based polymer may be required to satisfy the weight average molecular weight and the number average molecular weight in the above-described ranges at the same time while having the above-described molecular weight distribution range.

Particularly, the modified conjugated diene-based polymer may have molecular weight distribution of 3.0 or less, a weight average molecular weight of 100,000 g/mol to 5,000,000 g/mol, and a number average molecular weight of 100,000 g/mol to 2,000,000 g/mol. More particularly, the molecular weight distribution may be 2.5 or less, the weight average molecular weight may be 200,000 g/mol to 2,000,000 g/mol, and the number average molecular weight may be 150,000 g/mol to 1,000,000 g/mol.

Here, each of the weight average molecular weight and the number average molecular weight is a polystyrene conversion molecular weight analyzed by gel permeation chromatography (GPC), and the molecular weight distribution (Mw/Mn) is also known as polydispersity, wherein it was calculated as the ratio (Mw/Mn) of the weight average molecular weight (Mw) to the number average molecular weight (Mn). In addition, the number average molecular weight is a common average of the molecular weight of individual polymer, which is calculated by measuring the molecular weights of n polymer molecules, obtaining the total of the molecular weights, and dividing the total by n, and the weight average molecular weight represents molecular weight distribution.

In addition, according to another embodiment of the present invention, the modified conjugated diene-based polymer contains a functional group derived from the tertiary amine compound represented by Formula 1, and has a polystyrene conversion weight average molecular weight (Mw) analyzed by gel permeation chromatography of 100,000 g/mol to 3,000,000 g/mol, molecular weight distribution (Mw/Mn) of 1.30 to 2.50, and a ratio (Mw/Mp) of a weight average molecular weight (Mw) and a peak top molecular weight (Mp) of 0.70 to 1.125. Here, the peak top molecular weight (Mp) represents the molecular weight at a maximum peak.

In addition, the modified conjugated diene-based polymer according to an embodiment of the present invention may be a polymer having high linearity in which a value of -stress/relaxation (-S/R) at 100° C. is 0.5 or more. In this case, the -S/R denotes a change in stress in response to the same amount of strain generated in a material, wherein it is an index indicating the linearity of a polymer. Generally, the linearity of the polymer is low as the -S/R value is reduced, and rolling resistance or rotation resistance when the polymer is used in the rubber composition is increased as the linearity is reduced. Furthermore, branching degree and molecular weight distribution of the polymer may be estimated from the -S/R value, and the lower the -S/R value is, the higher the branching degree is and the wider the molecular weight distribution is. As a result, processability of the polymer is excellent, but mechanical properties are low. Here the -S/R value represents an absolute value.

Since the modified conjugated diene-based polymer according to an embodiment of the present invention has a high -S/R value of 0.5 or more at 100° C. as described above, resistance characteristics and a fuel consumption ratio may be excellent when used in the rubber composition. Particularly, the -S/R value of the modified conjugated diene-based polymer may be in a range of 0.5 to 1.5.

In addition, the modified conjugated diene-based polymer according to an embodiment of the present invention may have a mooney viscosity (MV) of 40 to 200, particularly, 40 to 100 or 60 to 120 at 100° C. The modified conjugated diene-based polymer according to the present invention has a mooney viscosity in the above-described range, and may have excellent processability.

In the present invention, the mooney viscosity was measured using a large rotor at a rotor speed of 2±0.02 rpm at 100° C. using a mooney viscometer, for example, MV2000E by Monsanto Co. Particularly, after the polymer was left for 30 minutes or more at room temperature (23±3° C.), 27±3 g of the polymer was taken and filled into a die cavity, and mooney viscosity was measured while applying a torque by operating a platen. In addition, the -S/R value was obtained by measuring a slope of change in the mooney viscosity obtained while the torque was released after measuring the mooney viscosity as an absolute value thereof.

In addition, the present invention provides a method of preparing a modified conjugated diene-based polymer containing a functional group derived from a modifier represented by Formula 1.

The preparation method according to an embodiment of the present invention is characterized in including polymerizing a conjugated diene-based monomer, or an aromatic vinyl-based monomer and a conjugated diene-based monomer in the presence of an organometal compound in a hydrocarbon solvent, to prepare an active polymer which is coupled with an organometal at one terminal (step 1); and reacting the active polymer with a tertiary amine compound represented by Formula 1 (step 2):

[Formula 1]

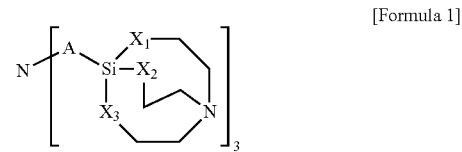

in Formula 1,

A is an alkylene group of 1 to 20 carbon atoms, and $X_1$ to $X_3$ are each independently an oxygen atom or an oxygen-containing alkylene group of 1 to 4 carbon atoms.

Particularly, the tertiary amine compound represented by Formula 1 may be the same as described above.

Step 1 is a step for preparing an active polymer which is coupled with an organometal in at least one terminal, and may be performed by polymerizing a conjugated diene-based monomer, or an aromatic vinyl-based monomer and a conjugated diene-based monomer in the presence of an organometal compound in a hydrocarbon solvent.

The polymerization of step 1 may use the conjugated diene-based monomer alone, or the aromatic vinyl-based monomer and the conjugated diene-based monomer together as the monomer. That is, a polymer prepared by the preparation method according to an embodiment of the present invention may be a homopolymer derived from the conjugated diene-based monomer, or a copolymer derived from the aromatic vinyl-based monomer and the conjugated diene-based monomer.

The conjugated diene-based monomer is not specifically limited, but, for example, may be one or more selected from the group consisting of 1,3-butadiene, 2,3-dimethyl-1,3-butadiene, piperylene, 3-butyl-1,3-octadiene, isoprene, and 2-phenyl-1,3-butadiene.

The aromatic vinyl-based monomer is not specifically limited, but may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene.

If the modified conjugated diene-based polymer is a copolymer derived from the conjugated diene-based monomer and the aromatic vinyl-based monomer, the conjugated diene-based monomer may be used in an amount such that a conjugated diene-based monomer derived unit in the modified conjugated diene-based polymer thus prepared is 60 wt % or more, particularly, 60 wt % to 90 wt %, more particularly, 60 wt % to 85 wt %.

The hydrocarbon solvent is not specifically limited, but, for example, may be one or more selected from the group consisting of n-pentane, n-hexane, n-heptane, isooctane, cyclohexane, toluene, benzene, and xylene.

The organometal compound may be used in 0.01 mmol to 10 mmol based on total 100 g of the monomer. The organometal compound is not specifically limited, but may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

The polymerization of step 1 may be performed by further adding a polar additive, and the polar additive may be added in an amount of 0.001 parts by weight to 10 parts by weight based on total 100 g of the monomer. Particularly, the polar additive may be added in an amount of 0.001 parts by weight to 1 part by weight, more particularly, 0.005 parts by weight to 0.1 parts by weight based on total 100 parts by weight of the monomer.

The polar additive may be one or more selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxy ethoxy ethane, bis(3-dimethylaminoethyl) ether, (dimethylaminoethyl) ethyl ether, trimethylamine, triethylamine, tripropylamine, and tetramethylethylenediamine.

If the conjugated diene-based monomer and the aromatic vinyl-based monomer are copolymerized using the polar additive in the preparation method according to an embodiment of the present invention, the reaction rate difference between them may be compensated, and the formation of a random copolymer may be induced easily.

The polymerization of step 1 may be conducted via an adiabatic polymerization, or an isothermal polymerization.

Herein, the adiabatic polymerization denotes a polymerization method including a step of performing polymerization not by optionally applying heat but by using its own reaction heat after injecting a polyfunctional anionic polymerization initiator, and the isothermal polymerization denotes a polymerization method in which the temperature of the polymer is constantly maintained by applying or taking away heat after injecting a polyfunctional anionic polymerization initiator.

The polymerization may be performed in a temperature range of −20° C. to 200° C., particularly in a temperature range of 0° C. to 150° C., more particularly 10° C. to 120° C.

Step 2 is a step for reacting the active polymer with the tertiary amine compound represented by Formula 1 so as to couple a functional group derived from the tertiary amine compound represented by Formula 1 with a polymerization chain.

The tertiary amine compound represented by Formula 1 may be used in a ratio of 0.01 mol to 5 mol with respect to 1 mol of an organometal compound.

Step 2 according to an embodiment of the present invention is a modification reaction for introducing a functional group to a polymer chain, and may be performed at 0° C. to 120° C. for 1 minute to 5 hours.

In addition, the preparation method of the modified conjugated diene-based polymer according to an embodiment of the present invention may be performed by a batch type or a continuous polymerization method including one or more reactors.

After completing the modification reaction, the polymerization reaction may be quenched by adding an isopropanol solution of 2,6-di-t-butyl-p-cresol (BHT) to a polymerization reaction system. Then, a desolvation treatment such as steam stripping for decreasing the partial pressure of a solvent via supplying vapor, or a vacuum drying treatment, a modified conjugated diene-based polymer may be obtained. In addition, in the reaction product obtained as the result of the modification reaction, an unmodified active polymer may be included together with the modified conjugated diene polymer.

The preparation method according to an embodiment of the present invention may further include one or more steps among recovering and drying of solvents and unreacted monomers after step 2 according to need.

Also, the present invention provides a tertiary amine compound represented by Formula 1, which may be easily applied as a modifier for rubbers.

The tertiary amine compound according to an embodiment of the present invention may be represented by the following Formula 1:

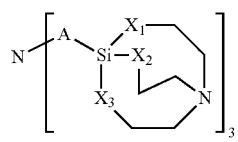

[Formula 1]

in Formula 1,

A is an alkylene group of 1 to 20 carbon atoms, and $X_1$ to $X_3$ are each independently an oxygen atom or an oxygen-containing alkylene group of 1 to 4 carbon atoms.

Meanwhile, particular materials of the tertiary amine compound represented by Formula 1 are the same as defined above.

In addition, the tertiary amine compound represented by Formula 1 according to the present invention includes a reactive functional group with a conjugated diene-based polymer, a functional group having affinity with a filler, and a functional group having affinity with a solvent, and the conjugated diene-based polymer may be easily modified in a high modification ratio, and the abrasion resistance, low fuel consumption ratio and processability of a rubber composition including the same and molded articles manufactured therefrom such as tires may be improved. Particularly, the tertiary amine compound represented by Formula 1 may include an amine group which is a reactive functional group with the polymer in a molecule, and the reactive functional group may modify the conjugated diene-based polymer in a high modification ratio by showing high reactivity with the active part of the conjugated diene-based polymer, thereby introducing a functional group into the conjugated diene-based polymer in a high yield. In addition, the amine group may react with the terminal of the conjugated diene-based polymer and change into a primary or secondary amino group, thereby further improving affinity with a filler, particularly, with carbon black.

Mode for Carrying Out the Invention

Furthermore, the present invention provides a rubber composition including the modified conjugated diene-based polymer and a molded article prepared from the rubber composition.

The rubber composition according to an embodiment of the present invention may include the modified conjugated diene-based polymer in an amount of 0.1 wt % to 100 wt %, particularly, 10 wt % to 100 wt %, more particularly, 20 wt % to 90 wt %. If the amount of the modified conjugated diene-based polymer is less than 0.1 wt %, effects of improving abrasion resistance and crack resistance of a molded article prepared by using the rubber composition, for example, a tire, may be insignificant.

Also, the rubber composition may further include other rubber components, if necessary, in addition to the modified conjugated diene-based polymer, and, in this case, the rubber component may be included in an amount of 90 wt % or less based on the total weight of the rubber composition. Specifically, the rubber component may be included in an amount of 1 part by weight to 900 parts by weight based on 100 parts by weight of the modified conjugated diene-based polymer.

The rubber component may be a natural rubber or a synthetic rubber, and, for example, the rubber component may be a natural rubber (NR) including cis-1,4-polyisoprene; a modified natural rubber, such as an epoxidized natural rubber (ENR), a deproteinized natural rubber (DPNR), and a hydrogenated natural rubber, in which the general natural rubber is modified or purified; and a synthetic rubber such as a styrene-butadiene rubber (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acrylic rubber, an urethane rubber, a silicon rubber, an epichlorohydrin rubber, and a halogenated butyl rubber. Any one thereof or a mixture of two or more thereof may be used.

Furthermore, the rubber composition may include 0.1 parts by weight to 150 parts by weight of a filler based on 100 parts by weight of the conjugated diene-based polymer, and the filler may include a silica-based filler, carbon black, or a combination thereof. Specifically, the filler may be carbon black.

The carbon black-based filler is not specifically limited, but, for example, may have a nitrogen surface area per gram ($N_2SA$, measured according to JIS K 6217-2:2001) of $m^2/g$ to 250 $m^2/g$. Also, the carbon black may have a dibutyl phthalate (DBP) oil absorption of 80 cc/100 g to 200 cc/100 g. If the nitrogen surface area per gram of the carbon black is greater than 250 $m^2/g$, processability of a rubber composition may be reduced, and, if the nitrogen surface area per gram of the carbon black is less than 20 $m^2/g$, reinforcement by carbon black may be insignificant. Furthermore, if the DBP oil absorption of the carbon black is greater than 200 cc/100 g, the processability of the rubber composition may be reduced, and, if the DBP oil absorption of the carbon black is less than 80 cc/100 g, the reinforcement by carbon black may be insignificant.

Also, the silica is not particularly limited, but, for example, may include wet silica (hydrous silicic acid), dry silica (anhydrous silicic acid), calcium silicate, aluminum silicate, or colloidal silica. Specifically, the silica may be wet silica in which an effect of improving both fracture characteristics and wet grip is the most significant. Furthermore, the silica may have a nitrogen surface area per gram ($N_2SA$) of 120 $m^2/g$ to 180 $m^2/g$, and a cetyltrimethylammonium bromide (CTAB) surface area per gram of 100 $m^2/g$ to 200 $m^2/g$. If the nitrogen surface area per gram of the silica is less than 120 $m^2/g$, reinforcement by silica may be reduced, and, if the nitrogen surface area per gram of the silica is greater than 180 $m^2/g$, the processability of a rubber composition may be reduced. Also, if the CTAB surface area per gram of the silica is less than 100 $m^2/g$, the reinforcement by silica, as the filler, may be reduced, and, if the CTAB surface area per gram of the silica is greater than 200 $m^2/g$, the processability of a rubber composition may be reduced.

If silica is used as the filler, a silane coupling agent may be used together for the improvement of reinforcement and low heat generation property.

Specific examples of the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or a mixture of two or more thereof may be used. More particularly, in consideration of the effect of improving the reinforcement, the silane coupling agent may be bis(3-triethoxysilylpropyl)polysulfide or 3-trimethoxysilylpropyl benzothiazyl tetrasulfide.

In addition, in the rubber composition according to an embodiment of the present invention, a modified conjugated diene-based polymer in which a functional group having high affinity with a filler is introduced in an active part is used as a rubber component, and the mixing amount of a silane coupling agent may be smaller than a common case. Particularly, the silane coupling agent may be used in 1 part by weight to 20 parts by weight based on 100 parts by weight of a filler. Within the amount range, effects as a coupling agent may be sufficiently achieved, and the gelation of rubber component may be prevented. More particularly, the silane coupling agent may be used in 5 parts by weight to 15 parts by weight based on 100 parts by weight of silica.

Also, the rubber composition according to the embodiment of the present invention may be sulfur cross-linkable, and, accordingly, may further include a vulcanizing agent.

The vulcanizing agent may specifically be sulfur powder, and may be included in an amount of 0.1 parts by weight to 10 parts by weight based on 100 parts by weight of the rubber component. When the vulcanizing agent is included within the above range, elastic modulus and strength required for a vulcanized rubber composition may be secured and, simultaneously, a low fuel consumption ratio may be obtained.

Furthermore, the rubber composition according to an embodiment of the present invention may further include various additives, such as a vulcanization accelerator, a process oil, a plasticizer, an antiaging agent, a scorch inhibitor, zinc white, stearic acid, a thermosetting resin, or a thermoplastic resin, used in the general rubber industry, in addition to the above-described components.

The vulcanization accelerator is not particularly limited, but, specifically, a thiazole-based compound, such as 2-mercaptobenzothiazole (M), dibenzothiazyl disulfide (DM), and N-cyclohexylbenzothiazole-2-sulfenamide (CZ), or a guanidine-based compound, such as diphenylguanidine (DPG), may be used. The vulcanization accelerator may be included in an amount of 0.1 parts by weight to 5 parts by weight based on 100 parts by weight of the rubber component.

Also, the process oil acts as a softener in the rubber composition, wherein the process oil may be a paraffin-based, naphthenic-based, or aromatic-based compound, and more particularly, the aromatic-based compound may be used in consideration of tensile strength and abrasion resistance, and the naphthenic-based or paraffin-based process oil may be used in consideration of hysteresis loss and low temperature characteristics. The process oil may be included in an amount of 100 parts by weight or less based on 100 parts by weight of the rubber component, and if the process oil is included in the above amount, decreases in tensile strength and low heat generation property (low fuel consumption ratio) of the vulcanized rubber may be prevented.

Furthermore, specific examples of the antiaging agent may be N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone. The antiaging agent may be used in an amount of 0.1 parts by weight to 6 parts by weight based on 100 parts by weight of the rubber component.

The rubber composition according to an embodiment of the present invention may be obtained by kneading the above mixing formulation using a kneader such as a Banbury mixer, a roll, and an internal mixer, and a rubber composition having excellent abrasion resistance as well as low heat generation property may be obtained by a vulcanization process after molding.

Accordingly, the rubber composition may be suitable for the preparation of each member of a tire, such as a tire's tread, an under tread, a sidewall, a carcass coating rubber, a belt coating rubber, a bead filler, a chafer, and a bead coating rubber, or various industrial rubber products such as an anti-vibration rubber, a belt conveyor, and a hose.

The molded article prepared by using the rubber composition may include a tire or a tire's tread.

Hereinafter, the present invention will be described in more detail, according to specific examples and experimental examples. However, the following examples and experimental examples are merely presented to exemplify the present invention, and the scope of the present invention is not limited thereto.

EXAMPLE 1

To a 20 L autoclave reactor, 270 g of styrene, 710 g of 1,3-butadiene, 5,000 g of n-hexane, and 0.86 g of 2,2-di(2-tetrahydrofuryl)propane (DTP) as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes, 20 g of 1,3-butadiene was injected for capping the terminal of a polymer chain with butadiene. After 5 minutes, 0.8 mol of tri(2-(2,8,9-trioxa-5-aza-1-silabicyclo[3,3,3]undecan-1-yl) ethyl)amine was injected, and the modification reaction was conducted for 15 minutes. Then, the polymerization reaction was quenched using ethanol, and 45 ml of a solution in which butylated hydroxytoluene (BHT) was dissolved in hexane as an antioxidant by 0.3 wt %, was added thereto. The polymer thus obtained was added to hot water heated using steam and stirred to remove solvents, followed by roll drying to remove remaining solvents and water to prepare a modified styrene-butadiene copolymer.

EXAMPLE 2

A modified styrene-butadiene copolymer was prepared by the same method described in Example 1 except for performing modification reaction by injecting 0.5 mol of tri(2-(2,8,9-trioxa-5-aza-1-silabicyclo[3,3,3]undecan-1-yl)ethyl) amine in Example 1.

EXAMPLE 3

A modified styrene-butadiene copolymer was prepared by the same method described in Example 1 except for performing modification reaction by injecting 1.2 mol of tri(2-(2,8,9-trioxa-5-aza-1-silabicyclo[3,3,3]undecan-1-yl)ethyl) amine in Example 1.

EXAMPLE 4

A modified styrene-butadiene copolymer was prepared by the same method described in Example 1 except for performing modification reaction by injecting 0.2 mol of tri(2-(2,8,9-trioxa-5-aza-1-silabicyclo[3,3,3]undecan-1-yl)ethyl) amine in Example 1.

Comparative Example 1

To a 20 L autoclave reactor, 270 g of styrene, 710 g of 1,3-butadiene, 5,000 g of n-hexane, and 0.86 g of 2,2-di(2-tetrahydrofuryl)propane (DTP) as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes, 20 g of 1,3-butadiene was injected for capping the terminal of a polymer with butadiene. Then, the polymerization reaction was quenched using ethanol, and 45 ml of a solution in which butylated hydroxytoluene (BHT) was dissolved in hexane as an antioxidant by 0.3 wt %, was added thereto. The polymer thus obtained was added to hot water heated using steam and stirred to remove solvents, followed by roll drying to remove remaining solvents and water to prepare an unmodified styrene-butadiene copolymer.

Comparative Example 2

A modified styrene-butadiene copolymer was prepared by the same method described in Example 1 except for performing modification reaction by using dichlorodimethylsilane instead of tri(2-(2,8,9-trioxa-5-aza-1-silabicyclo[3,3,3]undecan-1-yl)ethyl)amine in Example 1.

Experimental Example 1

With respect to each of the copolymers prepared in Examples 1 to 4 and Comparative Examples 1 and 2, a weight average molecular weight (Mw), a number average molecular weight (Mn), polydispersity (PDI), component analysis and mooney viscosity (MV) were measured. The results are shown in Table 1 below.

1) Component Analysis

Styrene derived unit (SM) and vinyl contents in each copolymer were measured using NMR.

2) Analysis of Molecular Weight

The weight average molecular weight (Mw) and the number average molecular weight (Mn) of each copolymer were measured by gel permeation chromatography (GPC). In this case, two PLgel Olexis columns and one PLgel mixed-C column, by Polymer Laboratories were used in combination. Also, all newly replaced columns were mixed-bed type columns, and polystyrene was used as a GPC standard material when calculating molecular weights. The polydispersity (PDI) was calculated as a ratio (Mw/Mn) of the weight average molecular weight to the number average molecular weight thus measured by the method.

3) Analysis of Mooney Viscosity

After pre-heating two specimens having a weight of 15 g each, the mooney viscosity of each copolymer was measured at 100° C. for 4 minutes using MV-2000 (Alpha Technologies Co.).

TABLE 1

| Category | Component analysis (NMR) | | GPC (g/mol, X10$^4$) | | | | Mooney viscosity (MV) |
|---|---|---|---|---|---|---|---|
| | Styrene | Vinyl | Mn | Mw | Mp | PDI | |
| Example 1 | 27.2 | 42.5 | 32 | 54 | 48 | 1.7 | 78 |
| Example 2 | 27.0 | 42.3 | 29 | 52 | 59 | 1.8 | 70 |
| Example 3 | 26.8 | 42.0 | 30 | 48 | 42 | 1.6 | 61 |
| Example 4 | 27.1 | 42.1 | 34 | 56 | 62 | 1.6 | 82 |
| Comparative Example 1 | 27.0 | 43.2 | 31 | 50 | 48 | 1.6 | 70 |
| Comparative Example 2 | 27.3 | 43.0 | 28 | 54 | 48 | 1.9 | 74 |

Experimental Example 2

To comparatively analyze the physical properties of a rubber composition including each of the modified or unmodified copolymers of Examples 1 to 4, Comparative Examples 1 and 2, and a molded article manufactured therefrom, tensile properties and viscoelasticity properties were measured. The results are shown in Table 2 below.

1) Preparation of Rubber Composition

Each rubber composition was prepared via a first stage mulling and a second stage mulling. In this case, the amounts of materials except for a modified conjugated diene-based copolymer used are represented based on 100 parts by weight of the copolymer. In the first stage mulling, by using a banbury mixer equipped with a temperature controlling apparatus, 137.5 parts by weight of each copolymer, 70 parts by weight of silica, 11.2 parts by weight of bis(3-triethoxysilylpropyl)tetrasulfide as a silane coupling agent, 25 parts by weight of a process oil (TDAE), 2 parts by weight of an antiaging agent (TMDQ), 3 parts by weight of zinc oxide (ZnO), 2 parts by weight of stearic acid, and 1 part by weight of wax were mixed and mulled. In this case the temperature of the mixer was controlled, and a first mixture compound was obtained at a discharge temperature of 145-155° C. In the second stage mulling, the first mixture compound was cooled to room temperature, and 1.75 parts by weight of a rubber accelerator (CZ), 1.5 parts by weight of a sulfur powder and 2 parts by weight of a vulcanization accelerator were added to the mixer, and mixed at 100° C. or less to obtain a second compound mixture. Then, a curing process was performed at 100° C. for 20 minutes to prepare each rubber composition.

1) Tensile Properties

The tensile properties were measured by manufacturing each specimen for test and measuring tensile strength when broken and tensile stress when stretched by 300% (300% modulus) of each specimen according to an ASTM 412 tensile test method. Particularly, measurement of tensile properties and 300% modulus were performed by using a Universal Test machin 4204 tensile tester (Instron Co., Ltd.) at room temperature at a rate of 50 cm/min.

3) Viscoelasticity Properties

Viscoelasticity properties were obtained by measuring tan δ while changing deformation at each measurement temperature (−60° C. to 60° C.) and a frequency of 10 Hz with a twist mode by using a dynamic mechanical analyzer (TA Co., Ltd.), and indexing based on the measured value of Comparative Example 1. In this case, the indexing was conducted via Mathematical Equations 1 and 2 below.

[Mathematical Equation 1]
$$\text{Tan}\,\delta(\text{at } 0° \text{ C.}) = \left(\frac{\text{Measured value} - \text{Standard value}}{\text{Standard value}} \times 100\right) + 100$$

[Mathematical Equation 2]
$$\text{Tan}\,\delta(\text{at } 60° \text{ C.}) = \left(\frac{\text{Standard value} - \text{Measured value}}{\text{Standard value}} \times 100\right) + 100$$

In Mathematical Equations 1 and 2, the standard value is a measured value of Comparative Example 1, and the measured values are measured values in the remaining examples and comparative example.

TABLE 2

| Category | | Example 1 | Example 2 | Example 3 | Example 4 | Comparative Example 11 | Comparative Example 12 |
|---|---|---|---|---|---|---|---|
| Tensile properties | Tensile strength (kgf/cm$^2$) | 183 | 178 | 175 | 178 | 187 | 168 |
| | 300% tensile stress (kgf/cm$^2$) | 115 | 110 | 108 | 105 | 88 | 98 |

TABLE 2-continued

| Category | | Example 1 | Example 2 | Example 3 | Example 4 | Comparative Example 11 | Comparative Example 12 |
|---|---|---|---|---|---|---|---|
| Viscoelasticity properties | Tan δ at 0° C. (Index) | 113 | 112 | 108 | 106 | 100 | 101 |
| | Tan δ at 60° C. (Index) | 121 | 117 | 110 | 108 | 100 | 105 |

As shown in Table 2, the tensile properties and viscoelasticity properties of the rubber compositions including the modified styrene-butadiene copolymers of Example 1 to Example 4 prepared using a modifier according to an embodiment of the present invention are better than the rubber compositions including the copolymers of Comparative Example 1 and Comparative Example 2.

In particular, the rubber compositions including the modified styrene-butadiene copolymers of Example 1 to Example 4 prepared using a modifier according to an embodiment of the present invention were secured to show increased Tan δ value at 0° C. (index value increase) and decreased Tan δ value at 60° C. (index value increase) when compared to the rubber composition including the unmodified styrene-butadiene copolymer of Comparative Example 1 and a rubber composition including the modified styrene-butadiene copolymer of Comparative Example 2 using a common modifier. The results verify that the modified styrene-butadiene copolymer prepared using a modifier according to an embodiment of the present invention shows excellent wet skid resistance and rolling resistance and a high fuel consumption ratio.

The invention claimed is:

1. A modified conjugated diene-based polymer comprising a functional group derived from a tertiary amine compound represented by the following Formula 1:

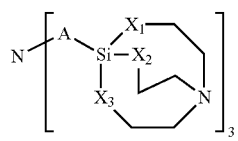

[Formula 1]

in Formula 1,

A is an alkylene group of 1 to 20 carbon atoms, and $X_1$ to $X_3$ are each independently an oxygen atom or an oxygen-containing alkylene group of 1 to 4 carbon atoms.

2. The modified conjugated diene-based polymer of claim 1, wherein in Formula 1, A is an alkylene group of 1 to 10 carbon atoms, and $X_1$ to $X_3$ are each independently an oxygen atom or an oxygen-containing alkylene group of 1 to 2 carbon atoms.

3. The modified conjugated diene-based polymer of claim 1, wherein the tertiary amine compound represented by Formula 1 is represented by the following Formula 2:

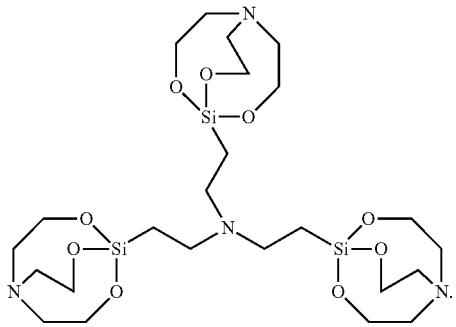

[Formula 2]

4. The modified conjugated diene-based polymer of claim 1, wherein the polymer has a number average molecular weight of 150,000 g/mol to 1,000,000 g/mol.

5. The modified conjugated diene-based polymer of claim 1, wherein the polymer has molecular weight distribution (Mw/Mn) of 1.0 to 3.0.

6. The modified conjugated diene-based polymer of claim 1, wherein the polymer comprises an aromatic vinyl-based monomer unit in 40 wt % or less.

7. A method of preparing a modified conjugated diene-based polymer described in claim 1, the method comprising:

1) polymerizing a conjugated diene-based monomer, or an aromatic vinyl-based monomer and a conjugated diene-based monomer in the presence of an organometal compound in a hydrocarbon solvent, to prepare an active polymer which is coupled with an organometal at one terminal; and 2) reacting the active polymer with a tertiary amine compound represented by Formula 1:

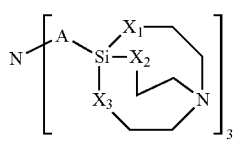

[Formula 1]

in Formula 1,

A is an alkylene group of 1 to 20 carbon atoms, and $X_1$ to $X_3$ are each independently an oxygen atom or an oxygen-containing alkylene group of 1 to 4 carbon atoms.

8. The method of preparing a modified conjugated diene-based polymer of claim 7, wherein the organometal compound is used in 0.01 mmol to 10 mmol based on total 100 g of the monomers.

9. The method of preparing a modified conjugated diene-based polymer of claim 7, wherein the organometal compound is one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

10. The method of preparing a modified conjugated diene-based polymer of claim 7, wherein the polymerization of step 1) is performed by additionally adding a polar additive.

11. The method of preparing a modified conjugated diene-based polymer of claim 10, wherein the polar additive is added in an amount of 0.001 parts by weight to 10 parts by weight based on total 100 parts by weight of the monomer.

12. The method of preparing a modified conjugated diene-based polymer of claim 7, wherein the tertiary amine compound represented by Formula 1 is used in 0.01 mol to 5 mol with respect to 1 mol of the organometal compound.

13. A modified conjugated diene-based polymer comprising a functional group derived from a tertiary amine compound represented by Formula 1, and having a polystyrene conversion weight average molecular weight (Mw) analyzed by gel permeation chromatography of 100,000 g/mol to 3,000,000 g/mol,
molecular weight distribution (Mw/Mn) of 1.30 to 2.50, and
a ratio (Mw/Mp) of a weight average molecular weight (Mw) and a peak top molecular weight (Mp) of 0.70 to 1.125:

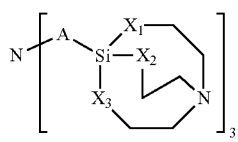

[Formula 1]

in Formula 1,
A is an alkylene group of 1 to 20 carbon atoms, and
$X_1$ to $X_3$ are each independently an oxygen atom or an oxygen-containing alkylene group of 1 to 4 carbon atoms.

14. A method of preparing the modified conjugated diene-based polymer described in claim 13, the method comprising:
1) polymerizing a conjugated diene-based monomer, or an aromatic vinyl-based monomer and a conjugated diene-based monomer in the presence of an organometal compound in a hydrocarbon solvent, to prepare an active polymer which is coupled with an organometal at one terminal; and
2) reacting the active polymer with the tertiary amine compound represented by Formula 1:

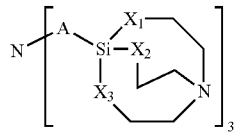

15. The method of claim 14, wherein the organometal compound is used in 0.01 mmol to 10 mmol based on total 100 g of the monomers.

16. The method of claim 14, wherein the organometal compound is one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

17. The method of claim 14, wherein the polymerization of step 1) is performed by additionally adding a polar additive, and
wherein the polar additive is added in an amount of 0.001 parts by weight to 10 parts by weight based on total 100 parts by weight of the monomer.

18. The method of claim 14, wherein the tertiary amine compound represented by Formula 1 is used in 0.01 mol to 5 mol with respect to 1 mol of the organometal compound.

19. A tertiary amine compound represented by the following Formula 1:

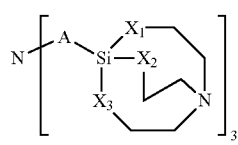

[Formula 1]

in Formula 1,
A is an alkylene group of 1 to 20 carbon atoms, and
$X_1$ to $X_3$ are each independently an oxygen atom or an oxygen-containing alkylene group of 1 to 4 carbon atoms.

20. The tertiary amine compound of claim 19, wherein the tertiary amine compound represented by Formula 1 is represented by the following Formula 2:

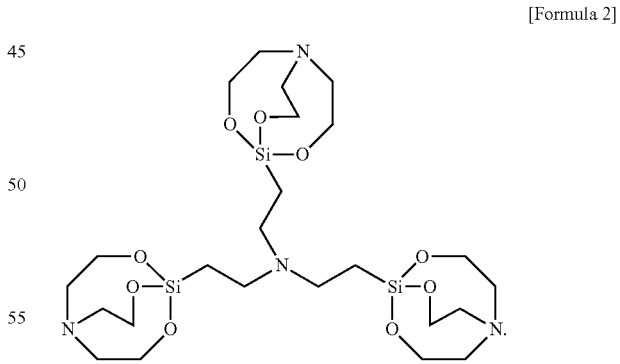

[Formula 2]

* * * * *